This invention relates to a method for the extraction of hydrocarbons containing aromatic hydrocarbons. More particularly, it relates to a solvent separating process which is capable of separating by continuous extraction high purity aromatic hydrocarbons and high purity non-aromatic hydrocarbons from hydrocarbons containing both aromatic and non-aromatic hydrocarbons, employing an extraction column having a comparatively small number of stages.

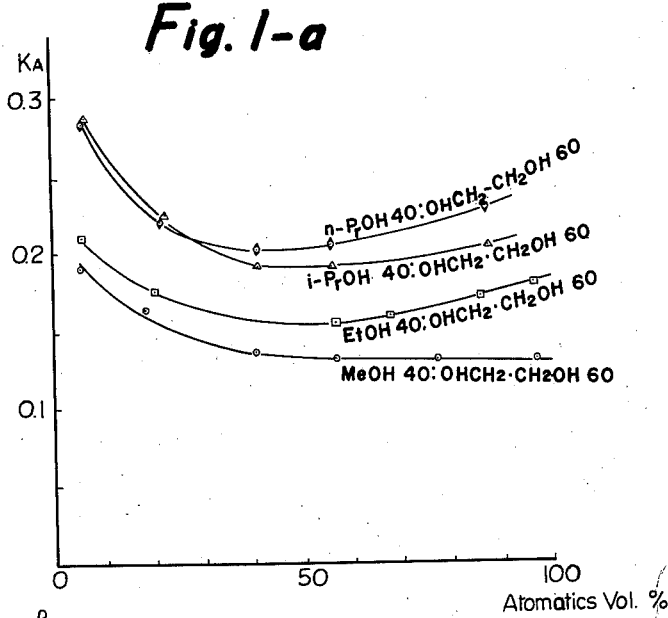
Fig. 1-a
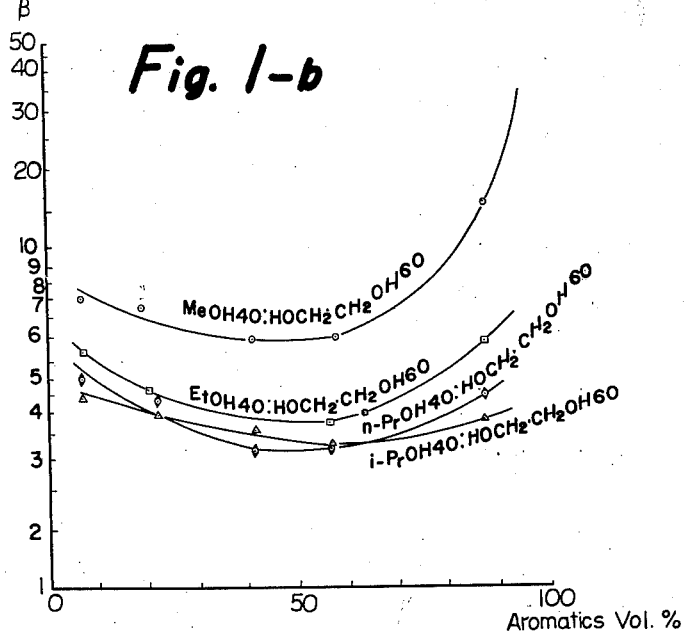
Fig. 1-b 3,125,512
PROCESS FOR THE EXTRACTIVE SEPARATION SELECTIVELY OF AROMATIC HYDROCARBONS FROM HYDROCARBONS CONTAINING BOTH AROMATIC AND NON-AROMATIC HYDROCARBONS
Kozo Higuchi, Tetsuro Osa, and Takao Takeuchi, all of Tokyo, Japan, assignors to Hokkaido Tanko Kisen Kabushiki Kaisha, Tokyo, Japan, a corporation of Japan
Filed July 14, 1959, Ser. No. 827,125
Claims priority, application Japan July 18, 1958
6 Claims. (Cl. 208—323)

While the separation of either of the hydrocarbon oils as is contained in the mixed oils of aromatic hydrocarbons and non-aromatic hydrocarbons of the paraffin and naphthene type is a very important operation from the standpoint of the acquisition of chemical raw materials, because of the increase in the demand in recent years particularly for aromatic compounds, there has arisen the demand for the selective separation only of aromatized light petroleum oils and coal-tar light oils.

Among the hitherto known methods for separation of aromatic hydrocarbons there are, for example, such methods as azeotropic distillation, extractive distillation, and adsorption. Other than these, the method of extraction by means of solvents which are selective as to aromatic hydrocarbons is known.

Generally, the requirements of extraction solvents to be employed in extracting aromatic hydrocarbons from hydrocarbons containing both aromatic and non-aromatic hydrocarbons are: that they are of low cost and easily available; that they possess stability as well as being non-corrosive; that there is a reasonable difference between the specific gravity of the extraction solvents and that of the feed stocks to be extracted; and that not only the recovery of the extraction solvents is good, but also factors of still greater importance, are that the solubility of the components to be extracted, i.e. the aromatic hydrocarbons, is high and moreover the solubility of non-aromatic component in the extraction solvent is low, the extractive operation is simple, and the extractive efficiency is not impaired by the intervention of water etc.

Those of especial importance among the various properties that are desired of an extraction solvent will be described with further detail below.

(a) As to whether the solubility of the components to be extracted, i.e., the aromatic hydrocarbons, is high, and the solubility of the non-aromatic components is low, is indicated by the distribution coefficient and the degree of selectivity, respectively.

Now, A is made to represent aromatic hydrocarbons, B, non-aromatic hydrocarbons, and C, the extraction solvent. After adding C to the mixture of A and B, they are separated into X and Y layers. The content of A in the X layer is represented by $X_A$ and the content of B by $X_B$. If the Y layer is made to contain a large amount of the extraction solvent C, and the content of A in this layer is represented by $Y_A$, and the content of B is represented by $Y_B$, the distribution coefficient and the degree of selectivity is defined as follows:

The distribution coefficient with respect to aromatic hydrocarbons is as follows:

$$K_A = Y_A/X_A$$

The degree of selectivity is as follows:

$$\beta = Y_A/X_A \times X_B/Y_B = K_A \times X_B/Y_B$$

Now, when the mixed oils of aromatic hydrocarbons and non-aromatic hydrocarbons are separated with extraction solvents, if $K_A$ is large, it means that aromatic hydrocarbons transfer in greater quantities to the extract layer leaving less in the raffinate layer. Hence, there is the advantage that a lesser quantity of extraction solvent is used. However, when aromatic hydrocarbons in particular are to be separated selectively, it is most desirable that the extract layer contains only aromatic hydrocarbons and that no non-aromatic hydrocarbons are contained therein. This corresponds to $\beta$ being large. Thus, it is possible to employ the degree of selectivity $\beta$ as the prime yardstick for deciding the performance characteristics of an extracting solvent.

(b) In order to facilitate the carrying out of the extractive operation, first, it must be such that not only the extractive operation can be performed at ordinary or atmospheric temperatures and ordinary atmospheric pressures, but also the size of the tower, i.e., the number of stages of the column, must be comparatively small, and moreover, aromatic hydrocarbons of high purity must be obtainable. In this connection, it is important that the degree of selectivity $\beta$ of the extraction solvent, as described in (a), above, is high with respect to hydrocarbons containing large quantities of aromatic hydrocarbons, for example, those containing more than 80% by volume of aromatic hydrocarbons. The reason for this is as follows: Even if the selectivity be high with respect to those hydrocarbons whose aromatic hydrocarbon content is not great, e.g., those whose content is from 30–60% by volume, in case the selectivity of the aromatic hydrocarbons is low with respect to those hydrocarbons whose content of aromatic hydrocarbons is high, e.g., more than 80%, such as mentioned above, it becomes necessary to design an extraction column with an extremely large number of stages in order to obtain aromatic hydrocarbons of high purity. At the same time, the installation of an extraction column of too great a number of stages, i.e., an extraction column whose height is high, is from the practical standpoint an impossibility. And, even if the extraction column is divided into multiple units and arranged in line to take the place of a supposedly high extraction column, in this case, not only would it be not worth performing the reflux operation, but with the unnecessary increase in the amount of the extraction columns and auxiliary equipment the control of the operation as well as the obtaining of hydrocarbons of high purity would be still difficult; and moreover, since the cost of the product obtained would be high, it would not be desirable.

It is to be understood that all percentage figures in this specification, unless otherwise indicated, represent percentages by weight.

In this connection, the specific gravity of the extraction solvent is required to be reasonably different from those of the aromatic hydrocarbons and the non-aromatic hydrocarbons. This is required, because the speed at which the X and Y layers separate varies in proportion to the difference between the specific gravities of the extraction solvent and the mixed oil in case of extraction solvent with high distribution coefficient and degree of selectivity. When this difference is great, the time for separation is shortened, and thus the operation is simplified.

(c) This also has a bearing on the operation being simplified as described in (b), above, but it is also necessary that after the extraction the separation of the extraction solvent and the aromatic hydrocarbons, which are the extracted components, can be performed with water and that the extractive efficiency of the extraction solvent, particularly its selectivity, is not impaired even though a certain amount of water is present in the extraction solvent or the feed stock to be extracted, i.e., the hydrocarbon. Generally, if water can be used for separating the extraction solvent and the aromatic hydrocarbons after the extraction of hydrocarbons containing both aromatic and non-aromatic hydrocarbons has been performed, it is not only economical, but also is very convenient from the operational standpoint. Considered from this angle, while it is necessary that the extraction solvent be miscible with water, on the other hand, in the recovery of the extraction solvent, it is practically impossible industrially to avoid a small amount of water, for example, about 0.5–3% of water, getting mixed in the extraction solvent. Accordingly, it is of extreme importance to select and use an extraction solvent whose extractive efficiency, particularly its selectivity, is not impaired, even if water in an amount such as above is present in the extraction solvent or the aromatic hydrocarbons.

As a result of much research concerning extraction solvents for use in extracting aromatic components from hydrocarbons containing both aromatic and non-aromatic hydrocarbons, the present applicants found that a mixture of methanol and ethylene glycol in which the latter was contained in an amount of 40–80% was very suitable as the extraction solvent to be employed in the selective extraction separation of aromatic hydrocarbons. In fact, the extraction solvent of this invention, which consists of a mixture of methanol and ethylene glycol in which the latter is contained in an amount of 40–80%, surprisingly possesses completely the desirable properties as described in sections (a), (b), and (c), above.

The extraction solvent of this invention, which consists of a mixture of methanol and ethylene glycol in which the latter is contained in an amount of 40–80% can be applied to the separation of the aforementioned aromatic hydrocarbons and non-aromatic hydrocarbons from the various kinds of hydrocarbons containing both (1) aromatic hydrocarbons whose boiling points are about 75–280° C., e.g., benzene and alkyl benzenes having side chains to the aromatic ring or benzene type derivatives such as toluene, xylene, ethylbenzene, n-propylbenzene, i-propylbenzene, ethyl toluene, trimethylbenzene, tetramethylbenzene, cumene, diphenyl, etc. and naphthalene and aromatic condensed rings type hydrocarbons containing alkyl naphthalene and naphthalene derivatives such as methyl naphthalene, dimethyl naphthalene, ethyl naphthalene, acenaphthene, etc.; and (2) non-aromatic hydrocarbons whose boiling points are about 65–280° C., e.g., paraffin hydrocarbons which include pentane, hexane, heptane, octane, nonane, decane, undecane, dodecane, tridecane, tetradecane, etc., and the various isomers thereof; and naphthene hydrocarbons which include cyclic saturated hydrocarbons such as cyclohexane, tetralin, etc., and cyclic saturated hydrocarbons having various side chains such as methyl cyclohexane, dimethyl cyclohexane, methyl decalin, etc. As hydrocarbons containing these aromatic and non-aromatic hydrocarbons, there can be mentioned, for example, such as crude petroleum, petroleum cracked oil, petroleum reformed oil, coal hydrocracked oil, coal carbonized oil, etc., which all contain aromatic hydrocarbons.

This invention can be applied to any of these hydrocarbon oil stocks and can separate therefrom with extreme ease at ordinary temperatures the above-described aromatic hydrocarbons and non-aromatic hydrocarbons.

In the drawings:

FIGS. 1a, 1b and 2 to 9 are graphs illustrating the solvent extraction operation, comparing that of this invention with that of the hitherto known methods;

Hereinafter, a description in further detail will be given regarding the ethylene glycol-methanol extraction solvent which contains 40–80% of the former.

In general, as an extraction solvent to be employed for the selective extraction separation of aromatic hydrocarbons from hydrocarbons containing both aromatic and non-aromatic hydrocarbons, the use of a primary solvent selected from the group consisting of a compound containing one hydroxyl group in the molecule and a compound containing two hydroxy groups and at least one or more ether groups in the molecule; and a secondary solvent containing at least two or more hydroxyl groups in the molecule and moreover miscible with the above primary solvent has already been proposed by Allen S. Smith U.S. Patent 2,444,582.

In accordance with the above U.S. Patent 2,444,582, as the above primary solvents there are, for example, cited methyl alcohol, ethyl alcohol, isopropyl alcohol, dipropylene glycol, tetraethylene glycol, hexaethylene glycol, nonaethylene glycol and "Carbowax 1500," and as the secondary solvents, there are, for example, cited such as ethylene glycol, diethylene glycol, triethylene glycol, tetraethylene glycol, propylene glycol, etc. It particularly recommends the use of the mixture of dipropylene glycol as the primary solvent and ethylene glycol as the secondary solvent.

However, according to the researches made by the present applicants, it was shown that when the mixed solvents of compounds containing one hydroxyl group in the molecule such as methyl alcohol, ethyl alcohol, i-propyl alcohol, etc., i.e., the primary solvent, and compounds such as, for example, ethylene glycol, diethylene glycol, etc., i.e., the secondary solvent, were checked as to their properties as an extraction solvent of hydrocarbons which contain both aromatic and non-aromatic hydrocarbons, as a general rule, it was shown that proportionately as the molecular weight of the primary solvent, i.e., the monohydric alcohol, increases, the distribution coefficient ($K_A$) of said mixed solvent, i.e. its solubility with respect to aromatic components of an identical extraction stock tends to increase somewhat. Moreover, as regards the dihydric alcohol, which is the secondary solvent, as the molecular weight increases, the distribution coefficient ($K_A$) also tends to increase slightly. However, concurrently with the increase in the molecular weight of either said primary or secondary solvents, the degree of selectivity ($\beta$) shows a sudden decrease.

Figure 2:
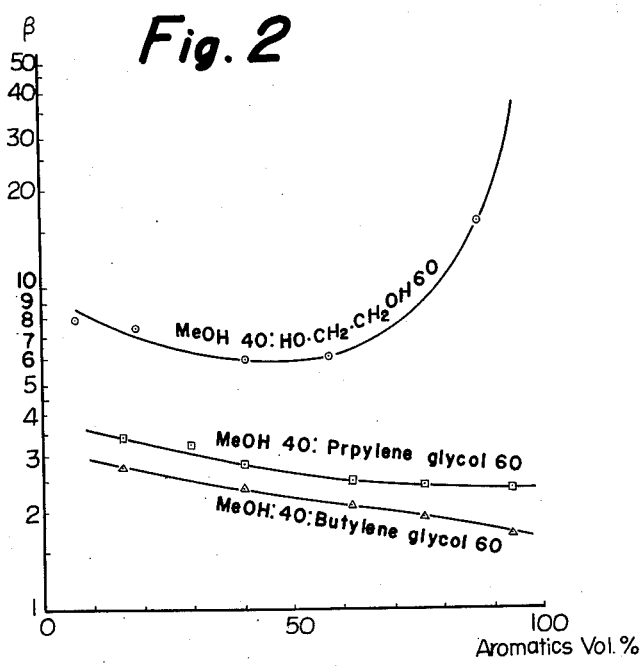

This fact is clearly shown by the specific examples of FIGURES 1a, 1b, and 2. Namely, FIGURE 1a is that which shows the changes in the distribution coefficient ($K_A$) of the mixed solvents in which methyl alcohol, ethyl alcohol, n-propyl alcohol and i-propyl alcohol were selected as the monohydric alcohol and were each mixed with ethylene glycol in a ratio of 40:60, while FIGURE 1b shows the changes of the degree of selectivity ($\beta$) in the same instances. In this case, as the extraction stock, there were used those in which aromatic hydrocarbons with boiling points of 100–140° C. and non-aromatic hydrocarbons with boiling points of 100–140° C. were mixed in various proportions, and the extractions were performed at ordinary temperatures.

And FIGURE 2 is that which shows the degree of selectivity ($\beta$) of the mixed solvents in which methyl alcohol was employed as the monohydric alcohol and was mixed in a ratio of 40:60 with ethylene glycol, propylene glycol, and butylene glycol, respectively, which latter were used as the dihydric alcohol. The extraction stock and the extraction temperature in this case was the same as in FIGURES 1a and 1b, above.

Figure 3:
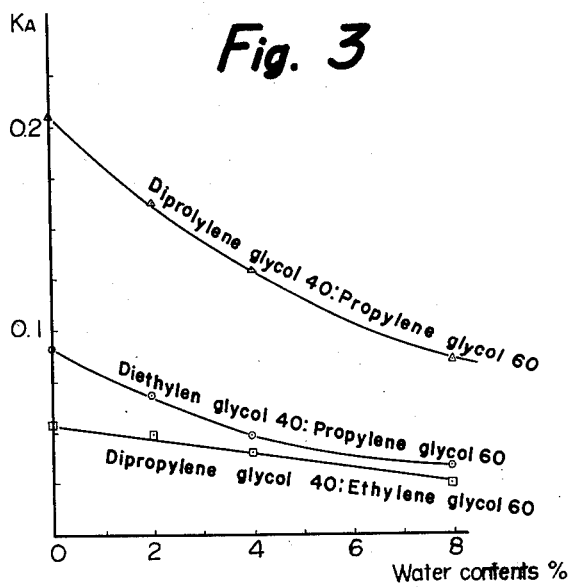
Figure 4:
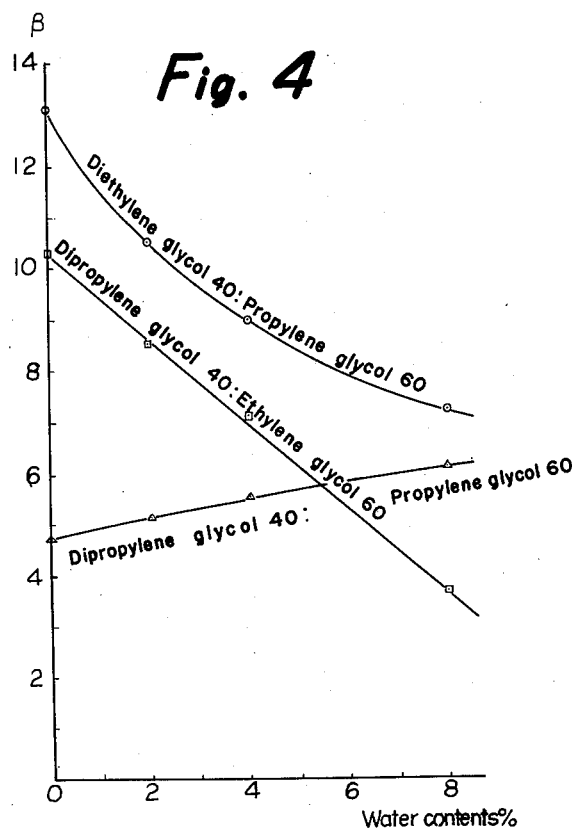

Also, when, for example, diethylene glycol and dipropylene glycol were selected and employed as the compound containing two hydroxyl groups and at least one or more ether groups in the molecule, i.e., the primary solvent, and ethylene glycol and propylene glycol were employed as the compound containing at least two or more hydroxyl groups in the molecule, i.e., the secondary solvent, the effects on the distribution coefficient ($K_A$) and the degree of selectivity ($\beta$) accompanying the changes in the content of water in the respective mixed solvents of dipropylene glycol with ethylene glycol, diethylene glycol with propylene glycol, and dipropylene glycol with propylene glycol, all mixed in the ratios of 40:60, are shown in FIGURES 3 and 4. As shown in FIGURES 3 and 4, in case the above primary and secondary solvents are employed, in all cases the distribution coefficients ($K_A$) decreased with the presence of water. Moreover, in both the mixed solvents of diethylene glycol with propylene glycol, and dipropylene glycol with ethylene glycol, when water was present, the degree of selectivity ($\beta$) abruptly decreased, while in case of the mixed solvent of dipropylene glycol and propylene glycol, the degree of selectivity ($\beta$) hardly was affected by the presence of water. As a conclusion it may be said that when these mixed solvents are employed as extraction solvents, with the presence of water, the distribution coefficient ($K_A$) abruptly decreases in every instance, and the phenomenon in which a notable increase in the degree of selectivity ($\beta$) takes place is never manifested.

Further, when, as the same type of mixed solvent, the mixed solvent of diethylene glycol and ethylene glycol is employed as the extraction solvent, since the distribution coefficient ($K_A$) from the first is low, with the presence of water, the distribution coefficient ($K_A$) decreases further, making it very difficult to measure the extraction results of the solvent. Thus, it has been found that this can never be employed as an extraction solvent of this invention. In this case, the hydrocarbon feed stock employed was a 50:50 mixture of aromatic hydrocarbons and non-aromatic hydrocarbons, both of which boiling temperatures were 100–140° C.

The mixed solvents of methyl alcohol and polyhydric alcohols containing two or more hydroxyl groups in the molecule other than ethylene glycol such as, for example, propylene glycol, butylene glycol, etc. also showed a tendency to a somewhat sudden decline in the distribution coefficient ($K_A$) with a very small amount of water being present therein.

Figure 5:
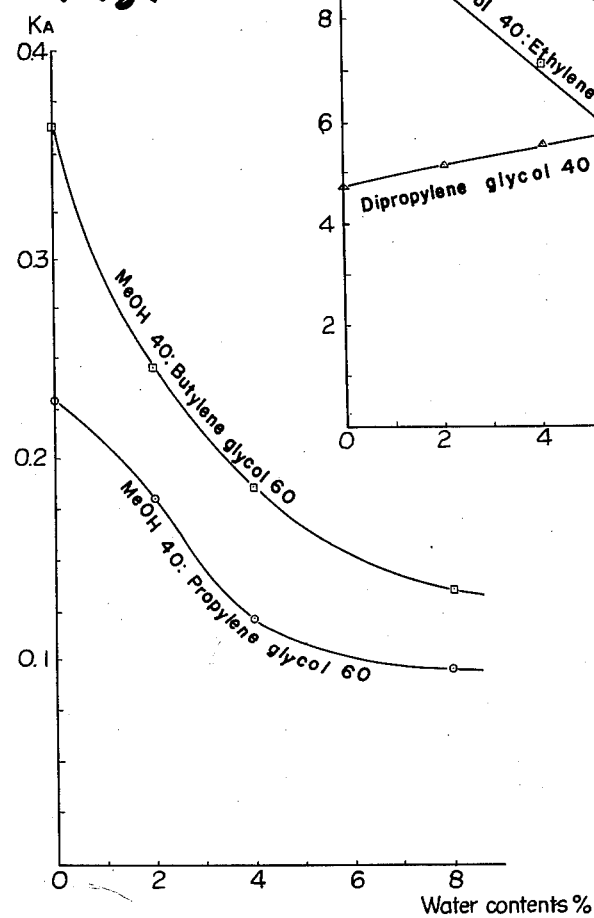

The effects on the distribution coefficient ($K_A$) when water was present in the respective mixtures of 40 parts of methyl alcohol with 60 parts of propylene glycol, and 40 parts of methyl alcohol with 60 parts of butylene glycol are shown in FIGURE 5.

Although, as described hereinabove, a very ideal solvent for this type of extraction solvent is that whose distribution coefficient is, from the practical standpoint, above a certain level required for extraction and whose degree of selectivity does not decline below a certain level at a given temperature, for example, ordinary temperatures, regardless of the content of aromatic hydrocarbons or the presence of a small amount of water in the hydrocarbon feed stock, heretofore an extraction solvent such as this had not been found at all.

Figure 6:
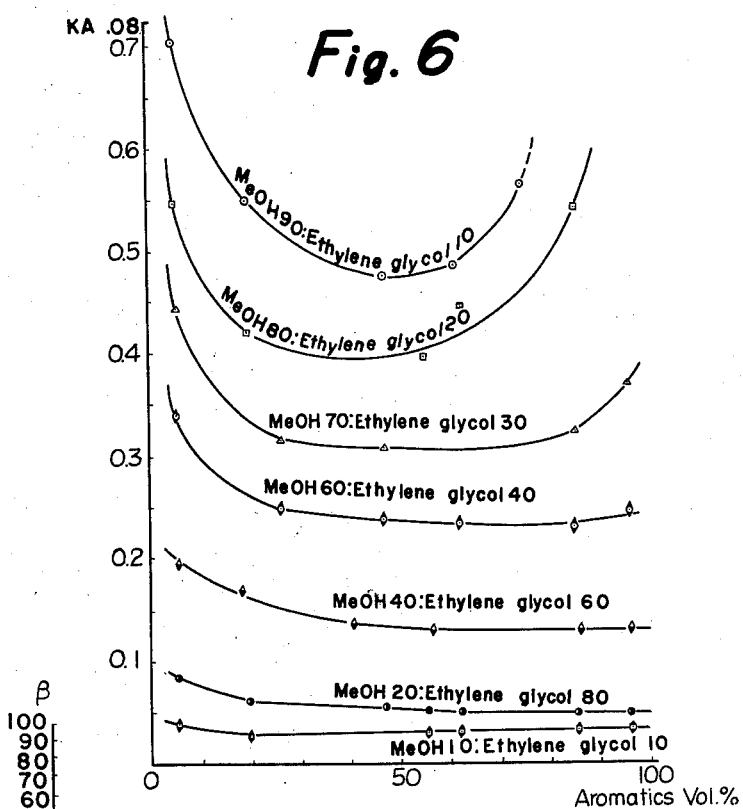
Figure 7:
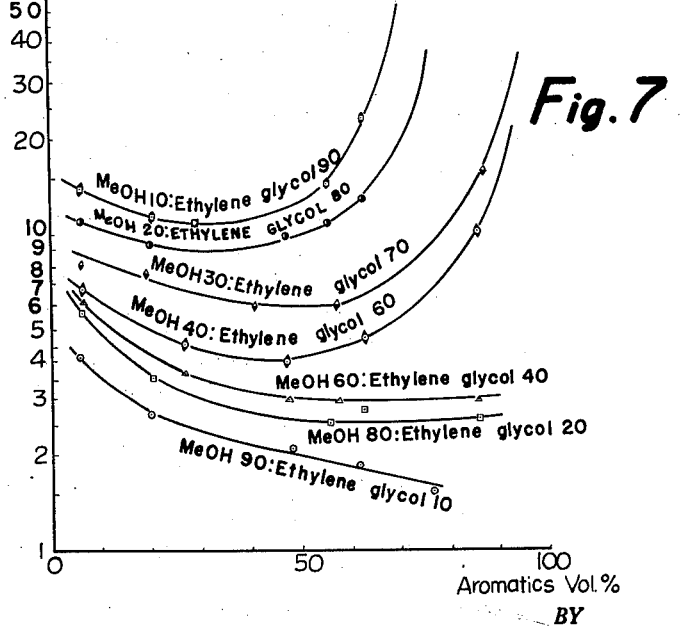
Figure 8:
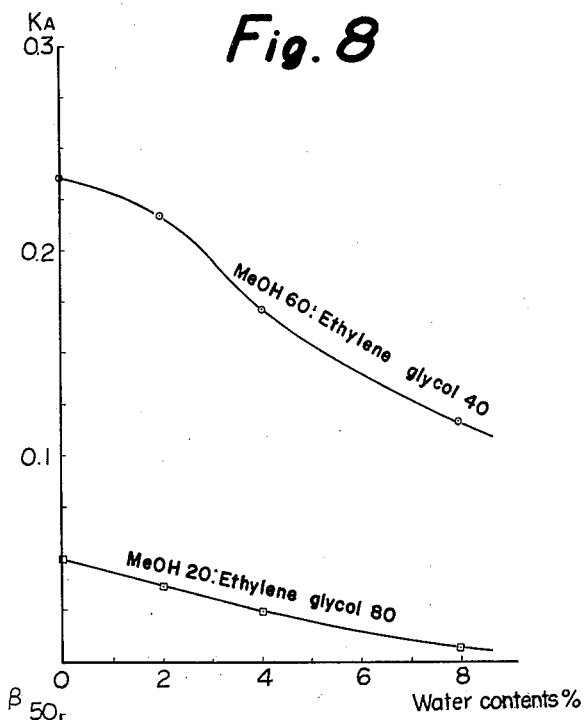
Figure 9:
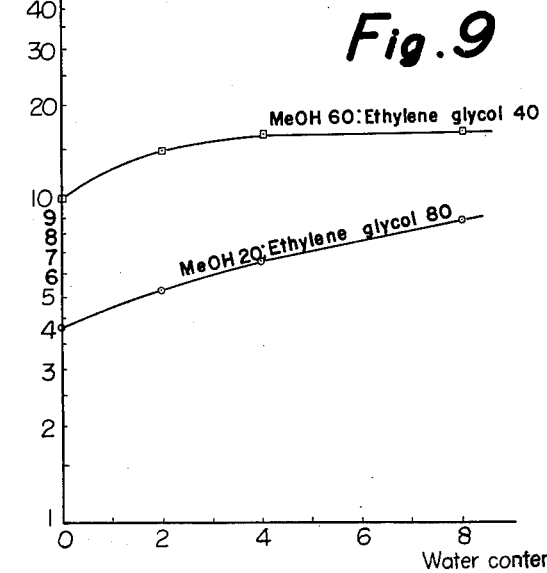

However, when the present applicants studied the distribution coefficients ($K_A$) and the degrees of selectivity ($\beta$) of the mixed solvents of ethylene glycol and methyl alcohol of various proportions with respect to the hydrocarbon mixtures of aromatic and non-aromatic hydrocarbons likewise of various proportions, results as shown in the respective attached drawings, FIGURES 6 and 7, were obtained. And when a study was made of the effects of the presence of water on the distribution coefficient ($K_A$) and degree of selectivity ($\beta$) in the two differently proportioned mixed solvents of ethylene glycol and methyl alcohol, i.e., one of which was in the ratio of 40:60 while the other was 80:20, results as shown in FIGURES 8 and 9 were obtained, and thus resulted in the discovery of a very unanticipated fact. The hydrocarbon feed stock employed in the experiment shown in FIGURES 8 and 9 was the same as in the case shown in FIGURE 3.

As is evident from the above FIGURES 6 through 9, the degree of selectivity ($\beta$) of the mixed solvent of ethylene glycol and methyl alcohol whose content of the former is less than 40% is not only generally low with respect to hydrocarbon feed stocks containing both aromatic and non-aromatic hydrocarbons, but also particularly with respect to those hydrocarbons that come within the range of those having a high content of aromatic hydrocarbons, the selectivity ($\beta$) not only declines but also in case, of mixed hydrocarbon oils of low boiling point, for example, benzene and cyclohexane, the layers of the extract solution and the raffinate become homogenized, and thus separation becomes impossible. On the other hand, when the content of ethylene glycol is more than 80%, the degree of selectivity ($\beta$) is excellent even with respect to those whose aromatic hydrocarbon content comes within the high range. However, the distribution coefficient ($K_A$) is very low regardless of the aromatic hydrocarbon content, and when water is present, the distribution coefficient ($K_A$) becomes still lower, and therefore will not possess the capacity as a satisfactory extraction solvent from a practical standpoint.

On the other hand, the mixed solvent of ethylene glycol and methyl alcohol according to this invention which contains 40–80% of ethylene glycol has not only an excellent distribution coefficient ($K_A$), but also even if a small amount of water is present, it does not decline rapidly. Hence, where the amount of water present is, for example, less than about 4%, the distribution coefficient ($K_A$) can not only be maintained sufficiently above the level required for extraction in practice, but also when water is present, the degree of selectivity ($\beta$) increases rather. Furthermore, in case of those hydrocarbon feed stock in which the content of aromatic hydrocarbons is high, for example, in the range of more than 80% by volume, the degree of selectivity ($\beta$) has the characteristic rather of rising abruptly.

The fact that the extracting capacity of the mixed solvent in accordance with this invention is not impeded in the least from the practical standpoint by the presence of water in about 0.5–4% or less possesses very great significance industrially. The reason for this is as follows. The mixed solvent of ethylene glycol-methyl alcohol containing 40–80% of the former of this invention, in the first place, can be separated from the extracted aromatic hydrocarbons after the extraction operation by employing water which is the cheapest material industrially. Moreover, on this occasion, when the used mixed solvent is being recovered by distillation after the separation operation, the presence in said mixed solvents of a small amount of water of about 0.5–4%, as described above, together with the water contained in the extraction feed stock is unavoidable industrially. Even if it is possible to remove this small amount of water present by distilling operation or other means, considering the fact that it is troublesome and expensive, there arises a very strong demand industriallly for an extraction solvent whose extraction capacity does not decline even if water is present in a small amount of, say, 0.5–4% by weight. Thus, the above mixed solvent of this invention by its maintenance of an excellent distribution coefficient ($K_A$) and degree of selectivity ($\beta$), completely fulfills the aforesaid demand.

Moreover, in the aforesaid mixed solvent according to this invention, since the specific gravity of methyl alcohol is 0.7928 at 20° C. and that of ethylene glycol is 1.113 at the same 20° C., and thus there is quite a difference between the specific gravities of the two, it is possible to prepare mixed solvents of varying specific gravities by suitably adjusting the mixing ratios of ethylene glycol and methyl alcohol within the range of the ethylene glycol content of 40–80%. Consequently, in accordance with this invention, it is possible to separate with ease the aromatic hydrocarbons contained in a wide range of hydrocarbon feed stocks including those hydrocarbon feed stocks containing comparatively large amounts of low-boiling hydrocarbons such as, for example, benzene, cyclohexane, hexane, etc. to those hydrocarbon feed stocks containing comparatively large amounts of high-boiling hydrocarbons such as, for example, methyl naphthalene, acenaphthene, tetralin, tetradecane, etc.

While the extraction in accordance with this invention can be accomplished very smoothly under ordinary temperatures and pressures as described above, extractions are ideally effected, for example, under ordinary pressure at a temperature, of less than 40° C. and, for example, under a pressure of less than 10 atmospheres at a temperature of less than about 130° C.

The mixed solvent of this invention are materials easily available industrially and of low cost, and moreover since they are of non-corrosive nature, there is no need whatsoever for use of special materials for the extraction apparatus. Further, it is possible not only to perform the extracting operation at ordinary temperatures and pressures, but also since the degree of selectivity is high as regards those hydrocarbons coming within the range of those whose content of aromatic hydrocarbons is high, aromatic hydrocarbons of high purity can be obtained by separation in an extraction column with a very small number of stages.

In practicing this invention, an extraction column can be employed such as either the type which consists of providing alternate calming and mixing sections, the packed type which is packed commonly, for example, such as with Rasching rings, the pulse type extraction column, etc.

Next, an example of the above extraction column of the type provided alternately with calming and mixing sections will be described while referring to FIGURE 10.

The extraction solvent is fed from the tank 7 through the pipe 10 to the upper section of the extraction column 1 having calming sections 3, mixing sections 4, and agitators 2 provided within these mixing sections. To any height in the vicinity of the mid-section of the column the hydrocarbon feed stock is fed from the tank 8 through the pipe 11, while the reflux is fed from the tank 9 through the pipe 12 to the lower section of the column at the respective required ratios. Further, at the bottommost and topmost parts of the extraction column 1, calming sections 5 and 6, respectively, are provided. 13, 14, and 15 are the respective pumps. 16, 17 and 18 are the flowmeters, and 19, 20, and 21 are the cocks. The extract solution passes through the pipe 23 having a cock 25 into the tank 27 where it is stored. And the raffinate, after passing through the pipe 22 provided with a cock 24, is stored in the tank 26.

Since in the raffinate which consists substantially of non-aromatic hydrocarbons, about 1% of the extraction solvent, i.e., the mixed solvent of ethylene glycol and methyl alcohol with the ratio as described above is mixed in, this is later recovered with a suitable solvent such as, for example, water, while the extract solution in the tank 27 is likewise extracted with a suitable solution such as water, etc., and after separation of the aromatic hydrocarbon, said mixed solvent is distilled and recovered.

In accordance with this invention when the extraction is performed by employing an extraction column of the type consisting alternately of a calming section and a mixing section such as described above, it is possible to obtain directly an extract containing aromatic hydrocarbons of a purity of about more than 95% by volume by separation of an extract with an extraction column of normally less than 35 stages, considering the above calming section and mixing section as a pair and counting them as one stage.

Further, in case an extraction column of the packed type is employed, it is likewise possible to obtain directly an extract containing aromatic hydrocarbons of a purity of about more than 95% by volume ordinarily with less than 40 theoretical stages. Next, this invention will be described by means of an example. This example, is, however, described merely for the purpose of illustrating this invention and it is to be understood that this invention is not to be limited in any manner whatsoever, except as defined in the appended claims.

EXAMPLE

Figure 10:
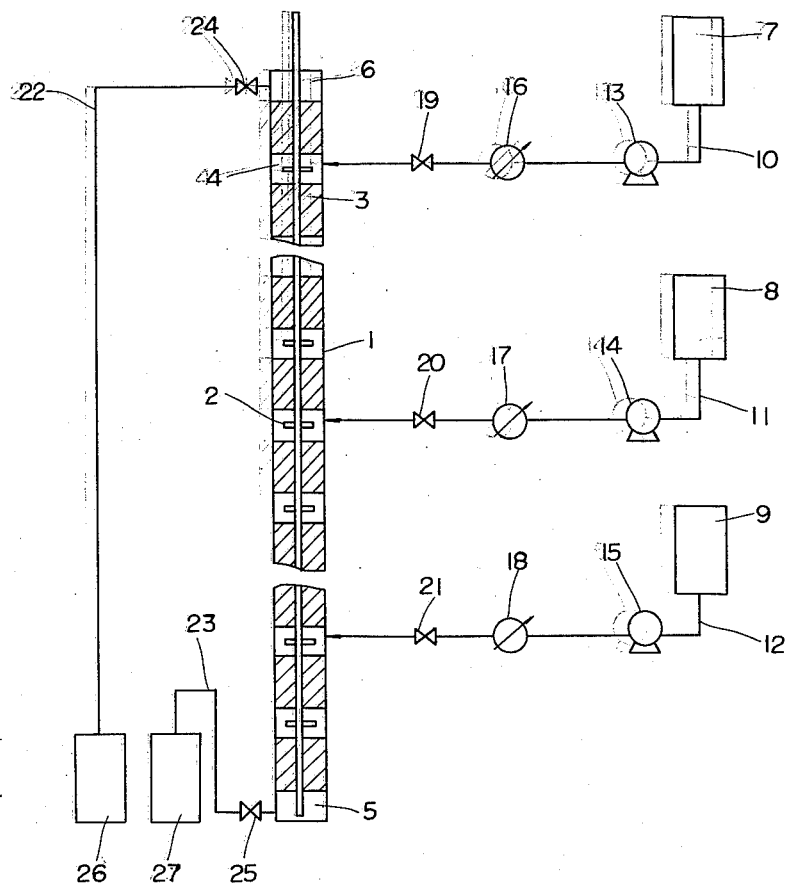
FIG. 10 is a diagrammatic view illustrating a specific system for carrying out the invention.

An extraction apparatus, as shown in the attached drawing, FIGURE 10, which comprises an extraction column whose effective column height is 3,600 mm., interior diameter is 100 mm., and consisting of 30 stages, one stage of which is constituted of a calming section 3 which is 90 mm. high and a mixing section 4 which is 30 mm. high and which mixing section is provided with an impeller 2 whose length is 50 mm., was employed. A mixed solvent of ethylene glycol and methyl alcohol whose ratio of mixture was 60:40 was employed and the hydrocarbon feed stock with the following composition was extracted at a flow rate of 20 liters/hour, the rate of feed of the hydrocarbon feed stock being 3 liters/hour.

*Hydrocarbon Feed Stock (Boiling Point—70–140° C.)*

| | By volume |
|---|---|
| Aromatic hydrocarbons | 50 |
| Non-aromatic hydrocarbons | 50 |

The reflux was hydrocarbons composed of 96% by volume of aromatic hydrocarbons and 4% of non-aromatic hydrocarbons with a boiling point of 70°–140° C. and its rate of feed was 4.5 liters/hour. Moreover, the feed pipe 12 of the reflux was made to open into the mixing section of the second stage from the bottom, the pipe 11 for feeding the hydrocarbon feed stock was made to open into the mixing section of the 10th stage from the bottom, and the pipe 10 for feeding the extraction solvent was made to open into the topmost mixing section.

When the extraction was effected as above, the flow of the extract was 25.6 liters/hour, and as a result, a hydrocarbon containing 96% by volume of aromatic hydrocarbons was obtained at the rate of 6.0 liters/hour.

On the other hand, the raffinate was obtained at the rate of 1.5 liters/hour and its content of non-aromatic hydrocarbons was 95% by volume. The amount of extraction solvent present in the raffinate was 0.6% by volume.

The term "theoretically calculated" as used herein denotes that which is described as follows:

The minimum theoretical stages obtained by drawing $x—y$ chart on a diagram in which the aromatic content in the raffinate layer (solvent-free basis) is plotted on the axis of abscissas and the aromatic content in the extract layer (solvent-free basis) is plotted on the axis of ordinates, thereafter effecting the construction in accordance with the McCabe-Thiele method of drawing with respect to the diagonal line of $y=x$ and the equilibrium curve (John H. Perry, "Chemical Engineer's Handbook," 3rd ed., pp. 736–737, McGraw-Hill Book Co.).

What is claimed is:
1. A process for the extractive separation selectively of aromatic hydrocarbons from hydrocarbons containing both aromatic and non-aromatic hydrocarbons with at least about 50% aromatics by volume which comprises extracting said aromatic hydrocarbons with a mixed solvent of ethylene glycol, methyl alcohol, and water wherein the ethylene glycol content of said mixtures is 40–80% by weight and the water content is in excess of 1% and up to about 4% by weight.

2. A process according to claim 1 wherein the aromatic hydrocarbons are those with boiling points of about 75° to about 280° C. and the non-aromatic hydrocarbons are those with boiling points of about 65° to about 280° C.

3. A process according to claim 1 wherein the extraction is effected under atmospheric pressure to 10 atmospheres at atmospheric temperatures to about 130° C.

4. A process according to claim 1 wherein the extraction is effected particularly at atmospheric temperatures and atmospheric pressures.

5. A process for obtaining directly an extract containing aromatic hydrocarbons of a purity of more than 95% by volume from hydrocarbons containing both aromatic and non-aromatic hydrocarbons with at least about 50% aromatics by volume which comprises separating said extract at a level of less than 35 stages of an extraction zone, each stage having a calming section and a mixing section, by using as an extraction solvent a mixed solution consisting of ethylene glycol, methyl alcohol, and water wherein the ethylene glycol content is 40–80% by weight and the water content is in excess of 1% and up to about 4% by weight.

6. A process for obtaining directly an extract containing aromatic hydrocarbons of a purity of more than 95% by volume from hydrocarbons containing both aromatic and non-aromatic hydrocarbons with at least about 50% aromatics by volume which comprises separating said extract at a level of less than 40 minimum theoretical stages of an extraction zone of the packed type, by using as an extraction solvent a mixed solution consisting of ethylene glycol, methyl alcohol, and water wherein the ethylene glycol content is 40–80% by weight and the water content is in excess of 1% and up to about 4% by weight.

References Cited in the file of this patent

UNITED STATES PATENTS

| | | |
|---|---|---|
| 2,167,632 | Brownscombe et al. | Aug. 1, 1939 |
| 2,407,820 | Durrum | Sept. 17, 1946 |
| 2,444,582 | Smith | July 6, 1948 |
| 2,850,461 | Bloch et al. | Sept. 2, 1958 |
| 2,938,858 | Brown | May 31, 1960 |

OTHER REFERENCES

Perry: Chemical Engineers' Handbook, third ed. 1950, publ. McGraw-Hill Book Co., N.Y., pp. 714 to 737.